US010066088B2

(12) United States Patent
McCaffrey (10) Patent No.: US 10,066,088 B2
(45) Date of Patent: Sep. 4, 2018

(54) STARCH COMPOSITIONS AND USE THEREOF

(71) Applicant: Plantic Technologies Ltd, Altona, Victoria (AU)

(72) Inventor: Nicholas John McCaffrey, Burwood (AU)

(73) Assignee: Plantic Technologies Ltd, Altona, Victoria (AU)

( * ) Notice: Subject to any disclaimer, the term of this patent is extended or adjusted under 35 U.S.C. 154(b) by 38 days.

(21) Appl. No.: 14/907,572

(22) PCT Filed: Apr. 16, 2015

(86) PCT No.: PCT/AU2015/050178
§ 371 (c)(1),
(2) Date: Jan. 26, 2016

(87) PCT Pub. No.: WO2015/157823
PCT Pub. Date: Oct. 22, 2015

(65) Prior Publication Data
US 2017/0029601 A1 Feb. 2, 2017

(30) Foreign Application Priority Data

Apr. 16, 2014 (AU) ................. 2014901399

(51) Int. Cl.
| | | |
|---|---|---|
| *C08L 3/04* | (2006.01) | |
| *C08L 3/06* | (2006.01) | |
| *C08L 3/08* | (2006.01) | |
| *B32B 9/02* | (2006.01) | |
| *B32B 7/12* | (2006.01) | |
| *B32B 9/04* | (2006.01) | |
| *B32B 27/08* | (2006.01) | |
| *B32B 27/20* | (2006.01) | |
| *B32B 27/30* | (2006.01) | |
| *B32B 27/32* | (2006.01) | |
| *B32B 27/34* | (2006.01) | |
| *B32B 27/36* | (2006.01) | |

(52) U.S. Cl.
CPC *C08L 3/06* (2013.01); *B32B 7/12* (2013.01); *B32B 9/02* (2013.01); *B32B 9/045* (2013.01); *B32B 27/08* (2013.01); *B32B 27/20* (2013.01); *B32B 27/304* (2013.01); *B32B 27/32* (2013.01); *B32B 27/34* (2013.01); *B32B 27/36* (2013.01); *C08L 3/04* (2013.01); *C08L 3/08* (2013.01); *B32B 2307/518* (2013.01); *B32B 2307/54* (2013.01); *B32B 2307/558* (2013.01); *B32B 2307/7163* (2013.01); *B32B 2307/724* (2013.01); *B32B 2307/736* (2013.01); *B32B 2439/70* (2013.01); *C08L 2205/02* (2013.01)

(58) Field of Classification Search
CPC ............. C08L 3/04; C08L 3/06; C08L 3/08
See application file for complete search history.

(56) References Cited

U.S. PATENT DOCUMENTS

| | | | | |
|---|---|---|---|---|
| 3,666,511 | A * | 5/1972 | Williams et al. | C08B 31/003 106/206.1 |
| 3,904,601 | A * | 9/1975 | Tessler | C08B 33/00 426/578 |
| 3,969,340 | A | 7/1976 | Tessler et al. | |
| 4,562,086 | A * | 12/1985 | Smolka | C08B 31/006 127/30 |
| 5,314,754 | A * | 5/1994 | Knight | B29C 47/0004 264/101 |
| 6,369,215 | B1 * | 4/2002 | Peltonen | C08B 31/16 536/102 |
| 6,749,880 | B1 * | 6/2004 | Woltjes | A23G 3/346 426/573 |
| 8,017,249 | B2 * | 9/2011 | Tippit | C08B 31/04 428/532 |
| 2004/0158056 | A1 * | 8/2004 | Hiemstra | C08B 31/003 536/47 |
| 2005/0084675 | A1 * | 4/2005 | Wang | C03C 25/321 428/375 |
| 2007/0128267 | A1 * | 6/2007 | Li | A61K 9/4816 424/451 |
| 2008/0171213 | A1 * | 7/2008 | Robben | B32B 9/02 428/533 |
| 2009/0208574 | A1 * | 8/2009 | Chen | A61K 9/286 424/474 |
| 2010/0189870 | A1 * | 7/2010 | Frohberg | C08B 30/044 426/622 |
| 2010/0297458 | A1 | 11/2010 | Khemani et al. | |
| 2011/0015385 | A1 * | 1/2011 | Timmermans | C08B 31/003 536/123.1 |

(Continued)

FOREIGN PATENT DOCUMENTS

| | | | | |
|---|---|---|---|---|
| JP | 2002104844 | A * | 4/2002 | ........ C03C 25/321 |
| JP | 2007-056206 | A | 3/2007 | |
| WO | 2013090973 | A1 | 6/2013 | |

OTHER PUBLICATIONS

Machine Translation of JP-2002104844-A (Year: 2018).*
Riku A. Talja et al., "Effect of Amylose Content on Physical and Mechanical Properties of Potato-Starch-Based Edible Films," Boimacromolecules, vol. 9, No. 2, (2008), pp. 658-663.
International Search Report issued in corresponding International Patent Application No. PCT/AU2015/050178 dated Jun. 5, 2015 (3 pages).
International Preliminary Report on Patentability issued in corresponding International Patent Application No. PCT/AU2015/050178 dated Aug. 10, 2015 (15 pages).

(Continued)

*Primary Examiner* — Liam J Heincer
(74) *Attorney, Agent, or Firm* — Kilyk & Bowersox P.L.L.C.

(57) ABSTRACT

There is provided a starch composition comprising a crosslinked starch. The composition may be useful in a variety of applications, for example, in thermoformed articles or as a component in multilayer films.

25 Claims, 1 Drawing Sheet

(56) References Cited

U.S. PATENT DOCUMENTS

2011/0318467 A1\* 12/2011 Evans ................... A23G 3/42
                                                    426/576
2013/0337118 A1\* 12/2013 Sistrunk ................ A23P 20/12
                                                    426/95
2016/0150810 A1\* 6/2016 Hume .................. A23P 20/12
                                                    426/102

OTHER PUBLICATIONS

Extended European Search Report and Opinion issued in corresponding European Patent Application No. 15780632.4 dated Oct. 27, 2016 (6 pages).
Bhat, R., "Varying amylose and total starch content in potato tubers derived from Finland and Sweden," Swedish University of Agricultural Sciences, Faculty of Natural Resources and Agricultural Sciences, Department of Food Science, Independent Project in Biology, Master Thesis, 2015, (4 pages).
Schwall et al., "Production of very-high-amylose potato starch by inhibition of SBE A and B," Nature Biotechnology, vol. 18, (2000), pp. 551-554.
Thuwall et al., Extrusion processing of high amylose potato starch materials, Carbohydrate Polymers, vol. 65 (2006), pp. 441-446.

\* cited by examiner

STARCH COMPOSITIONS AND USE THEREOF

The present application is a National Stage Application of PCT/AU2015/050178, filed Apr. 16, 2015, which claims priority to Australian Patent Application No. 2014901399, filed Apr. 16, 2014.

FIELD

Starch compositions are provided comprising at least one crosslinked starch. The compositions find particular, although not exclusive, use in packaging applications.

BACKGROUND

In recent years research has focused on the use of starch as an industrial raw material, which can reduce dependence on non-renewable resources. It is recognized that starch is composed of two components, a linear amylose component and a branched amylopectin component. Starches from different sources, for example, potato, corn, tapioca, and rice, are characterized by different relative proportions of the amylose and amylopectin components, which influence physicochemical properties such as gelatinization, water absorption and melt viscosity [Determination of Amylose Content in Different Starches Using Modulated Differential Scanning calorimetry, Moorthy, S. N., et al, Starch, 58 (2006) 209-214]. Several processes have been developed to produce a starch high in either amylose or amylopectin, including physical means of separation, classical plant breeding, and genetically engineered modification of the plants, such that primarily one type of starch is produced.

Generally, the physical properties of products comprising starch will improve when the amylose content is high. However, high amylose starches are more expensive than 'natural' low amylose starches (sometimes referred to as commodity starches) often leading to a trade off between price and performance.

Native starches may also be modified, via chemical, biochemical, and/or physical means, in order to produce certain properties. For example, chemical modification processes such as etherification or esterification retard starch retrogradation and effectively plasticise the starch, making it behave like a thermoplastic.

Although the efficacy of these special and modified starches is recognized, their cost may inhibit commercial acceptability of the products made from them. Furthermore, replacement of, for example, high amylose starch with a proportion of commodity low amylose starch, although providing starch compositions of overall lower cost, may also adversely affect physical properties.

Therefore a need remains to provide starch compositions that have desirable physical properties and which utilise inexpensive, renewable materials.

SUMMARY

There is provided a starch composition comprising:
a) at least one first starch having an amylose content greater than or equal to 50% by weight based on the dry weight of the first starch; and
b) at least one second starch having an amylose content less than or equal to 40% by weight based on the dry weight of the second starch;
wherein both the at least one first starch and at least one second starch are chemically modified so as to replace hydroxyl functionality with functionality selected from ethers or esters and mixtures thereof; and
wherein the at least one second starch is a crosslinked starch.

The at least one second starch may be present in an amount of at least 5% by weight, based on the total dry weight of starch in the composition. The at least one second starch may be present in an amount of at least 10%, or at least 15%, or at least 20% or at least 25%, or at least 30%, or at least 35%, or at least 40%, or at least 45%, or at least 50% by weight, based on the total dry weight of starch in the composition.

The at least one second starch may be derived from a starch treated with from 0.001 to 5% by weight, or from 0.001 to 2% by weight, or from 0.001 to 1% by weight or from 0.001 to 0.5% by weight of one or more crosslinking agents based on the dry weight of the second starch. The crosslinking agent may be a multifunctional agent known in the art to effect the crosslinking of starch. Exemplary, but non-limiting crosslinking agents include, phosphorus oxychloride, epichlorohydrin, hydrophobic cationic epoxides, sulphates, diacid anhydrides, such as adipic acid anhydride, and phosphate derivatives prepared by reaction with sodium or potassium orthophosphate or tripolyphosphate and combinations thereof.

Exemplary, but non limiting examples of both the first and second starch are wheat starch, corn starch, tapioca starch, potato starch, cassava starch, pea starch, oat starch, arrowroot starch, barley starch or rice starch and mixtures thereof.

The at least one first starch is a high amylose starch, that is, one containing at least 50% by weight of amylose based on the dry weight of the first starch. Suitable high amylose starches useful herein are any starches with an amylose content of at least 50% by weight, or at least 55% by weight, or at least 60% by weight, or at least 65% by weight, or at least 70% by weight, or at least 80% by weight, or at least 90% by weight, based on the dry weight of the first starch. While high amylose corn starch is suitable, other starches which are also useful include those derived from any plant species which produces or can be made to produce a high amylose content starch, for example, tapioca, peas, barley and rice. Additionally, high amylose starch may be obtained by separation or isolation, such as the fractionation of a native starch material, or by blending isolated amylose with a native starch.

The at least one first starch may be a corn starch or a tapioca starch having an amylose content of greater than or equal to 50% by weight based on the weight of the dry at least one first starch.

The at least one second starch is a low amylose starch, that is, one containing less than or equal to 40% by weight of amylose, or less than or equal to 35% by weight amylose, or less than or equal to 30% by weight amylose, or less than or equal to 25% by weight amylose, or less than or equal to 20% by weight amylose based on the dry weight of the second starch. While low amylose corn starch or low amylose tapioca starch are suitable, other starches which are also useful include those derived from any plant species which produces or can be made to produce a low amylose content starch, for example, peas, barley, potato, wheat and rice. Additionally, low amylose starch may be obtained by separation or isolation, such as the fractionation of a native starch material, or by blending isolated amylopectin with a native starch.

The at least one second starch may be a corn starch or a tapioca starch having an amylose content of less than or equal to 40% by weight based on the dry weight of the second starch.

Both the high and low amylose starch may be chemically modified either to the same or different degrees. By chemically modified it is meant that the starch may be derivatized or modified by typical processes known in the art, for example esterification or etherification. Chemically modified starches may include esters, such as the acetate and the half-esters of dicarboxylic acids/anhydrides, particularly the alkenylsuccinic acids/anhydrides and ethers, such as the hydroxyethyl and hydroxypropyl starches. These and other conventional modifications of starch are described in publications such as "Starch: Chemistry and Technology", Second Edition, edited by Roy L. Whistler et al., Chapter X; Starch Derivatives: Production and Uses by M. W. Rutenberg et al., Academic Press, Inc., 1984.

One modification of the high and low amylose starches that is especially advantageous, is the etherification with alkylene oxides, particularly those containing 2 to 6, or 2 to 4, carbon atoms. Ethylene oxide, propylene oxide and butylene oxide are exemplary compounds useful in etherifying the starting starch materials with propylene oxide being especially preferred. Varying amounts of such compounds may be used depending on the desired properties and economics. The chemical modification of the first and second starch may independently comprise a hydroxyalkyl $C_{2-6}$ group or the product of reaction of the first or second starch with an anhydride of a carboxylic acid.

Another modification of the high and low amylose starches that is especially advantageous, is acetylation to form a starch acetate. Varying levels of acetylation may be used depending on the desired properties and economics.

The chemical modification of the first and second starch may independently comprise a hydroxyalkyl $C_{2-6}$ group or the product of reaction of the first or second starch with an anhydride of a carboxylic acid to form an ester.

The first starch and the second starch may be modified with hydroxyalkyl $C_{2-6}$ groups. The first starch may be modified with hydroxyalkyl $C_{2-6}$ groups and the second starch may be modified by acetylation to form, for example, a starch acetate.

The first and second starch may be chemically modified so as to have, independently, a degree of substitution from 0.05 to 3.0. The degree of substitution defines the average number of substituents per anhydroglucose unit. Accordingly, by definition, the maximum possible degree of substitution of starch is 3.0.

The starch compositions disclosed herein present distinct advantages. Although the compositions contain a proportion of low amylose starch, the physical properties of articles prepared from the compositions may be maintained, relative to articles prepared from compositions comprising only high amylose starch. It was expected that crosslinking would result in a stiffer, more rigid material that was less tough and that would have a higher propensity to fracture. However this was not found to be the case. Without wishing to be bound by theory it is considered that introducing a crosslinked starch creates a 'rubber toughened' phase within the starch matrix, improving the physical properties, for example by improving the impact strength through preventing crack propagation. Accordingly, lower cost starch compositions may be prepared in which a proportion of a high amylose starch is replaced with a crosslinked low amylose starch.

The starch composition may further comprise one or more fillers or nanomaterials. These may be present in one or both of the first or second starches or may be added during formulation of the starch composition. The nanomaterials may be exfoliated within a starch nanocomposite. Exemplary nanomaterials include clays, carbon nanotubes, cellulose nanowhiskers and chitin whiskers. Exemplary clays include montmorillonite, bentonite, beidelite, mica, hectorite, saponite, nontronite, sauconite, vermiculite, ledikite, magadite, kenyaite, stevensite, volkonskoite or mixtures thereof. The nanomaterials or fillers may be modified. The nanomaterials or fillers may be hydrophobically modified. The nanomaterials may be modified clays, particularly 'hydrophobically modified layered silicate clays'.

A 'hydrophobically modified layered silicate clay' or 'hydrophobic clay' may be a clay modified by exchange with a surfactant comprising long chain alkyl groups such as a long chain alkylammonium ion, for example, mono- or di-$C_{12}$-$C_{22}$ alkylammonium ion. Polar substituents such as hydroxyl or carboxyl are preferably not attached to the long chain alkyl. Examples of suitable clays include CLOISITE® 20A or CLOISITE® 25A from Southern Clay Products Inc.

The fillers or nanomaterials may be present in an amount up to 20%, or up to 10%, or up to 5%, or up to 3% by weight, based on the total dry weight of the starch composition.

The starch composition may further comprise one or more fatty acids or fatty acid salts. These may be present in one or both of the first or second starches or may be added during formulation of the starch composition. Exemplary, but non-limiting, fatty acids include a $C_{12-22}$ fatty acid and/or a $C_{12-22}$ fatty acid salt. The fatty acid or fatty acid salt may be present in the starch composition from between 0.1 to 5% by weight based on the total dry weight of the starch composition. Where fillers are employed in the starch composition then fatty acids or fatty acids salts may in some cases be preferentially absent.

The starch composition may further comprise a polymer. The polymer may be a water soluble polymer. The polymer may be present in one or both of the first or second starches or may be added during formulation of the starch composition. The starch composition may comprise up to 20% by weight of a polymer, or from 4 to 12% by weight of a polymer based on the total dry weight of the starch composition. Polyvinyl alcohol is an exemplary but non limiting polymer in this regard.

The starch composition may further comprise one or more plasticisers. The plasticiser may be water or one or more polyols. The plasticiser may be present in an amount up to 20% by weight based on the total weight of the starch composition.

The starch composition may also comprise any combination of the hereinbefore described features.

There is also provided a thermoformed article comprising the starch composition according to any one of the embodiments as hereinbefore described. Exemplary thermoformed articles may include trays, containers or lids.

There is also provided an injection molded product comprising the starch composition according to any one of the embodiments as hereinbefore described.

There is also provided a multilayer film comprising the starch composition according to any one of the embodiments as hereinbefore described.

The multilayer film may comprise:
(a) at least one layer comprising a starch composition according to any one of the embodiments hereinbefore described; and
(b) at least one other layer.

The at least one other layer may have a water vapour permeability coefficient less than 1 g.mm/m$^2$.24 hr.atm measured at 38° C. and 90% relative humidity.

The at least one layer comprising a starch composition may also comprise up to 50% by weight of natural unmodified starch.

There is also provided a use of a multilayer film according to any of the aforementioned embodiments in packaging, preferably in packaging foodstuffs.

There is also provided an article of manufacture comprising the multilayer film according to any one of the aforementioned embodiments. Exemplary articles of manufacture include food packages, such as containers, lids, bags, stretch-wraps and films.

Throughout this specification, use of the terms "comprises" or "comprising" or grammatical variations thereon shall be taken to specify the presence of stated features, integers, steps or components but does not preclude the presence or addition of one or more other features, integers, steps, components or groups thereof not specifically mentioned.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited.

DETAILED DESCRIPTION

It will now be convenient to describe the present disclosure with reference to particular embodiments and examples. These embodiments and examples are illustrative only and should not be construed as limiting upon the scope of the disclosure. It will be understood that variations upon the described disclosure as would be apparent to the skilled addressee are within the scope of the disclosure. Similarly, the present disclosure is capable of finding application in areas that are not explicitly recited in this document and the fact that some applications are not specifically described should not be considered as a limitation on the overall applicability of the disclosure.

High Amylose Starch

The high amylose starch component may be a hydroxypropylated high amylose starch. Other substituents may be hydroxyethyl or hydroxybutyl to form hydroxyether substitutions, or anhydrides such as maleic, phthalic or octenyl succinic anhydride can be used to produce ester derivatives. The degree of substitution (the average number of hydroxyl groups in a glucose unit that are substituted) may be 0.01 to 2.0, or may be 0.01 to 1.5, or may be 0.02 to 1.5, or may be 0.02 to 1.0, or may be 0.05 to 1.5. A preferred high amylose starch is a high amylose corn starch. Another preferred high amylose starch is a high amylose tapioca starch. A preferred modified high amylose starch component is a hydroxypropylated high amylose starch. For example ECOFILM® marketed by National Starch and Chemical Company, or Gelose® A939 marketed by Penford.

Low Amylose Starch

The low amylose starch may be any commercially available starch. This may be derived from, for example, wheat, corn, tapioca, potato, rice, oat, arrowroot, and pea sources. A preferred low amylose starch is hydroxypropylated low amylose starch. Other substituents may be hydroxyethyl or hydroxybutyl to form hydroxyether substitutions, or anhydrides such as maleic, phthalic or octenyl succinic anhydride can be used to produce ester derivatives. Another preferred low amylose starch is an acetylated starch. The degree of substitution (the average number of hydroxyl groups in a glucose unit that are substituted) may be 0.01 to 2.0, or may be 0.01 to 1.5, or may be 0.02 to 1.5, or may be 0.02 to 1.0, or may be 0.05 to 1.5.

The hydroxyl groups on starch are able to react with multifunctional reagents resulting in crosslinked starches. Crosslinking is effected by low levels of reagent. The low amylose starch is crosslinked and may be derived from a starch treated with from 0.001 to 5% by weight, or 0.001 to 2% by weight, or 0.001 to 1% by weight, or 0.001 to 0.5% by weight of one or more crosslinking agents based on the dry weight of the low amylose starch. The low amylose starch may be treated with from 0.002 to 0.1% by weight of one or more crosslinking agents based on the dry weight of the low amylose starch. The low amylose starch may be treated with from 0.005 to 0.05% by weight of one or more crosslinking agents based on the dry weight of the low amylose starch. Exemplary, but non-limiting crosslinking agents include phosphorus oxychloride, epichlorohydrin, hydrophobic cationic epoxides, sulphates, diacid anhydrides, and phosphate derivatives prepared by reaction with sodium or potassium orthophosphate or tripolyphosphate and combinations thereof.

Measurement of the viscosity of a starch may provide a useful insight into the effect of crosslinking and may provide guidance as to the amount of crosslinking necessary in order to produce a desired effect. One such technique uses a Rapid Visco Analyser (RVA) which measures the viscosity dependence of temperature and time. The method employs a relatively extended time period during which the starch is exposed to high temperature (95° C.) under low/moderate shear. Crosslinked starches tend to increase in viscosity during the test whereas non-crosslinked starches tend to breakdown, resulting in a reduction is viscosity.

National 7 starch, utilised in the examples, is a non-crosslinked low amylose starch and viscosity measurements at 95° C. over time show a reduction in viscosity, indicating breakdown of the starch. In contrast, National Frigex®, which is a crosslinked low amylose starch, also utilised in the examples, shows a much higher viscosity when exposed to a high temperature/time profile.

In one preferred embodiment the first starch is a high amylose hydroxypropylated starch and the second starch is a low amylose hydroxypropylated starch. The low amylose starch is crosslinked.

In another preferred embodiment the first starch is a high amylose hydroxypropylated starch and the second starch is a low amylose acetylated starch. The low amylose acetylated starch is crosslinked.

Polymer

The polymer component of the starch composition, when present, may be compatible with starch, may be water soluble, may be biodegradable and may have a low melting point compatible with the processing temperatures for starch. Exemplary, but non-limiting, polymers may be selected from the group consisting of polyvinylacetate, polyvinyl alcohol or mixtures thereof. A preferred concentration range 4 to 12% by weight, more preferably 8%-12% by weight based on the dry weight of the starch composition.

Plasticiser

A range of plasticisers and humectants are useful additions to the starch in order to aid processing and control and stabilize the mechanical properties. The desired plasticiser content depends primarily on the required processing behaviour during processing and subsequent blowing or stretching processes, as well as on the required mechanical properties of the end product.

The plasticizer may be water, and/or one or more polyols, for example, glycerol, maltitol, mannitol, erythritol and xylitol, although, ethylene glycol and diethylene glycol may also be utilised. Water is a preferred plasticiser.

The water and/or polyol content may be up to 20% by weight of the starch composition depending on the particular application.

Other Plasticizers or Humectants

The plasticiser may be one or more of polyethylene glycol, polyethylene oxide, epoxidized linseed oil, epoxidized soybean oil, tributyl citrate, 2,2,4 trimethyl-1,3-pentanediol diisobutyrate, acetyl tri-ethyl citrate. These plasticisers may be utilised alternatively or in addition to the above mentioned polyols or water.

Humectants such as such as one or more of carrageenan, xanthan gum, gum arabic, guar gum, gelatine, sugar, glucose, carrageenan, gelatine, Xanthan Gum, Gum Arabic, Guar gum and glyceryl triacetate may be added to the starch composition.

Fatty Acid and/or Fatty Acid Salt

Fatty acids and/or fatty acid salts may be present in the starch composition. The starch composition may comprise between 0.1 to 5% by weight of a $C_{12-22}$ fatty acid and/or a $C_{12-22}$ fatty acid salt based on the total dry weight of the starch composition. The fatty acid and/or fatty acid salt component may be present in concentrations of 0.6 to 1% by weight based on the total dry weight of the starch composition. Stearic acid is a particularly preferred component. Sodium and potassium salts of stearic acid may also be used. Cost may be a factor in the choice of this component but lauric, myristic, palmitic, linoleic and behenic acids are all suitable.

Barrier Properties

Films formed from the herein disclosed starch compositions may exhibit improved gas and moisture barrier properties relative to starch compositions absent a low amylose crosslinked starch. For example, the oxygen transmission rate of films comprising the herein disclosed starch compositions may be less than for films comprising the high amylose non-crosslinked starch (first starch) and absent the low amylose crosslinked starch (second starch). Water vapour transmission rate may be similarly improved.

Films formed from starch compositions comprising a high amylose non-crosslinked starch (first starch) and a low amylose non-crosslinked starch may exhibit poorer gas and moisture barrier properties relative to compositions comprising a low amylose crosslinked starch. For example, the water vapour transmission rate of films comprising a high amylose non-crosslinked starch (first starch) and a low amylose non-crosslinked starch may be greater than for films comprising a high amylose non-crosslinked starch (first starch) and a low amylose crosslinked starch (second starch) or may be greater than for films comprising a high amylose non-crosslinked starch (first starch) and absent a low amylose crosslinked starch (second starch). Oxygen transmission rate may also be negatively affected.

Applications

The starch compositions may be useful in a variety of applications. For example, the starch compositions may be thermoformed into articles utilising methods well known in the art. Exemplary thermoformed articles may include trays, containers or lids. The starch compositions may also be useful as components in multilayer films, including, for example, barrier trays for extending the shelf life of perishable foods, including meat, poultry, fish, pasta, smallgoods, prepared meals and cheese. The starch compositions may also be useful in Modified Atmosphere Packaging (MAP) requiring control of gas permeation.

Multilayer Films

The starch composition may be useful in the manufacture of a multilayer film comprising:
(a) at least one layer comprising a starch composition according to any one of the embodiments hereinbefore described; and
(b) at least one other layer.

The multilayer film may comprise:
a) at least one layer comprising
  i. at least one first starch having an amylose content greater than or equal to 50% by weight based on the dry weight of the first starch; and
  ii. at least one second starch having an amylose content less than or equal to 40% by weight based on the dry weight of the second starch;
  wherein both the at least one first starch and at least one second starch are chemically modified so as to replace hydroxyl functionality with functionality selected from ethers or esters and mixtures thereof; and
  wherein the at least one second starch is a crosslinked starch; and
b) at least one other layer.

The at least one other layer may have a water vapour permeability coefficient less than 1 g.mm/m².24 hr.atm measured at 38° C. and 90% relative humidity.

The total thickness of the at least one layer comprising a starch composition may be greater than 20% of the total thickness of the multilayer film. The at least one first starch and at least one second starch may have a degree of substitution of less than 1.5.

The water vapour permeability coefficient of the at least one other layer may be less than 0.5 g.mm/m².24 hr.atm measured at 38° C. and 90% relative humidity, or less than 0.2 g.mm/m².24 hr.atm measured at 38° C. and 90% relative humidity.

The total thickness of the at least one layer comprising a starch composition may be greater than 30% of the total thickness of the multilayer film, or greater than 40% of the total thickness of the multilayer film, or greater than 50% of the total thickness of the multilayer film. The total thickness of the at least one layer comprising a starch composition may be greater than 60% of the total thickness of the multilayer film.

The multilayer film may have a low oxygen permeability coefficient (OPC). The multilayer film has an OPC less than 0.6 cm³ mm/m².24 h.atm at 50% relative humidity (RH). The multilayer film may have an OPC of less than 0.3 cm³ mm/m².24 h.atm at 50% RH or an OPC of less than 0.2 cm³ mm/m².24 h.atm at 50% RH. The multilayer film may have an OPC of less than 0.1 cm³ mm/m².24 h.atm at 50% RH or the multilayer film may have an OPC of less than 0.05 cm³ mm/m².24 h.atm at 50% RH.

The multilayer film may have an OPC less than 1.2 cm³ mm/m².24 h.atm at 75% relative humidity (RH). The multilayer film may have an OPC of less than 0.6 cm³ mm/m².24 h.atm at 75% RH or an OPC of less than 0.2 cm³ mm/m².24 h.atm at 75% RH. The multilayer film may have an OPC of less than 0.1 cm$^3$ mm/m$^2$.24 h.atm at 75% RH or the multilayer film may have an OPC of less than 0.05 cm$^3$ mm/m$^2$.24 h.atm at 75% RH.

The OPC may remain below 0.05 cm$^3$ mm/m$^2$.24 h.atm at 50% RH, for extended periods of time. The OPC may remain below 0.05 cm$^3$ mm/m$^2$.24 h.atm at 50% RH for at least ten days, or the OPC may remain below 0.05 cm$^3$ mm/m$^2$.24 h.atm at 50% RH for 20 days, or the OPC may remain below 0.05 cm$^3$ mm/m$^2$.24 h.atm at 50% RH for thirty days. The OPC may remain below 0.05 cm$^3$ mm/m$^2$.24 h.atm at 50% RH for thirty days.

Accordingly, the multilayer films have an enhanced performance in respect of oxygen barrier properties over long periods of time. The time to reach equilibrium moisture content may be extended using controlled water vapour transmission rate other layers. The equilibrium % moisture content within the starch layer may be lower due to % relative humidity/% moisture content gradients within the other layer materials.

Such longevity in respect of gas barrier performance is clearly desirable in extending the shelf life of packaged perishable foodstuffs.

Advantageously, from a renewable perspective the multilayer film may contain a high proportion of biodegradable starch.

The thickness of the multilayer film and of each layer within the multilayer film may vary depending on the exact nature of the end use application.

The total thickness of the multilayer film may be between 10 and 1000 microns. The total thickness of the multilayer film may be between 10 and 100 microns, or between 20 and 80 microns. The total thickness of the multilayer film may be between 100 and 1000 microns or between 200 and 800 microns.

The total thickness of the at least one layer comprising a starch composition may be between 5 and 600 microns. The total thickness of the at least one layer comprising a starch composition may be between 5 and 50 microns, or between 10 and 40 microns. The total thickness of the at least one layer comprising a starch composition may be between 100 and 600 microns, or between 150 and 450 microns.

The total thickness of the at least one other layer may be between 5 and 400 microns. The total thickness of the at least one other layer may be between 5 and 25 microns or between 10 and 20 microns. The total thickness of the at least one other layer may be between 30 and 400 microns, or between 30 and 300 microns.

The at least one layer comprising a starch composition may have a total thickness between 100 and 600 micron and the at least one other layer may have a total thickness between 10 and 400 micron. The at least one layer comprising a starch composition may have a total thickness between 100 and 400 micron and the at least one other layer may have a total thickness between 40 and 250 micron.

The at least one layer comprising a starch composition may have a total thickness between 10 and 60 micron and the at least one other layer may have a total thickness between 5 and 40 micron.

The at least one layer comprising a starch composition may comprise water, preferably up to 20% by weight water, more preferably up to 12% by weight water. The water may serve as a plasticiser.

The moisture content of the at least one layer comprising a starch composition may be the equilibrium moisture content at the environmental % relative humidity. For example, the equilibrium moisture content may range from about 4% at low % RH to more than 15% at high % RH.

The at least one layer comprising a starch composition may also comprise up to 50% by weight of natural unmodified starch.

The layer comprising a starch composition and/or the other layer may comprise colourants.

Other Layer

The other layer(s) may be chosen to impart certain physical and aesthetic properties to finished multilayer film. These properties may include, for example, antifog, strength, heat sealability, colour, or clarity. The other layers may be those having a low water vapour transmission rate.

The at least one other layer may comprise a polyolefin, polyethylene terephthalate, polyethylene terephthalate glycol, polylactic acid, nylon, polyvinylchloride, polyvinylidene dichloride, cellulose, a water resistant protein layer, a water resistant layer comprising silica, or mixtures thereof. Each of the other layers may comprise a mixture of components. One or more of the other layers may consist of multiple layers of different materials. Each of the other layers may comprise different materials. The layers may be solvent cast or sputter coated.

Suitable polyolefins for the preparation of the polyolefin film layer may be selected from the group consisting of ethylene homopolymers, propylene homopolymers, interpolymers of ethylene and propylene and interpolymers of ethylene or propylene with one or more $C_4$-$C_{10}$ $\alpha$-olefins, cyclic olefin polymers and copolymers, biaxially orientated polypropylene, and mixtures thereof.

Suitable polyolefins may be selected from copolymers of ethylene or propylene and one or more $\alpha$-olefins. Both high density polyethylenes and linear low density polyethylenes may be utilised.

Suitable linear low density polyethylenes (LLDPE) may include copolymers of ethylene and $\alpha$-olefins (about 5 to about 15 wt. %). Alpha-olefins may include 1-butene, 1-hexene, 1-octene, and the like, and mixtures thereof. The density of LLDPE is within the range of about 0.865 to about 0.925 g/cm$^3$ Suitable high density polyethylenes (HDPE) may include ethylene homopolymers and copolymers of ethylene and $\alpha$-olefins (about 0.1 to about 10 wt. %). Suitable alpha-olefins may include 1-butene, 1-hexene, 1-octene, and the like, and mixtures thereof. The density of HDPE is preferably from about 0.940 to about 0.970 g/cm$^3$.

Suitable cyclic olefin polymers and copolymers may include polymers of norbornene or tetracyclododecene and copolymers of norbornene or tetracyclododecene with one or more $\alpha$-olefins. Examples include cyclic olefin polymers are Topas (Ticona) and Apel (Mitsui).

Blends of polyolefins and other polymers may be advantageously employed. Cast polypropylene (cPP) or biaxially oriented polypropylene (BOPP) may be chosen for improved strength and low WVTR. Polyethylene terephthalate (PET) may be chosen for strength and shrinkability.

Modified polyolefins, such as grafted polyolefins, may be utilised. A preferred grafted polyolefin is a maleic anhydride grafted polyolefin.

Polyolefins

Suitable LLDPE, HDPE and polypropylene may be produced by a Ziegler, single-site, or any other olefin polymerization catalyst. Ziegler catalysts and co-catalysts are well known in the art. Metallocene single-site catalysts are transition metal compounds that contain cyclopentadienyl (Cp) or Cp derivative ligands. For example, U.S. Pat. No. 4,542, 199, teaches the preparation of metallocene catalysts. Non-metallocene single-site catalysts containing heteroatomic ligands, e.g., boraaryl, pyrrolyl, azaborolinyl or quinolinyl are also well known in the art.

The HDPE may also be multimodal. By "multimodal" it is meant that the polymer comprises at least two components, one of which has a relatively low molecular weight, the other a relatively high molecular weight. The multimodal polyethylene can be produced by polymerization using conditions that create a multimodal polymer product. This can be accomplished by using a catalyst system with two or more different catalytic sites or by using two or multi-stage polymerization processes with different process conditions in the different stages (e.g. different temperatures, pressures, polymerization media, hydrogen partial pressures, etc). Multimodal HDPE may be produced by a multistage ethylene polymerization, using a series of reactors, with comonomer addition in only one of the reactors.

The at least one other layer may comprise one or more materials derived from one or more renewable materials. The polyethylene or polypropylene may be derived from one or more renewable materials. The polyethylene may be prepared from ethanol derived from, for example, sugar cane, sugar beet or wheat grain. The polyethylene terephthalate may be derived from bio-polyols.

Adhesive

The at least one other layer may be fixed to the at least one layer comprising a starch composition through use of a suitable adhesive. This may assist in minimising slip and therefore maintaining excellent barrier performance. Numerous suitable adhesives would be readily apparent to those having skill in the present art. The adhesive may be selected so as to chemically bond to the at least one layer comprising a starch composition. Useful adhesives may comprise one or more polyurethanes or epoxies.

Advantageously, the use of an adhesive may overcome or minimise the need for modified or grafted other layers to be utilised as tie layers. Accordingly, for example, standard film polyethylene grades may be successfully employed as polyolefin other layers in the multi-layer film. This may be desirable from a cost consideration.

Other suitable adhesives may include EVA copolymers, acrylic copolymers and terpolymers, ionomers, metallocene derived polyethylene, maleic anhydride modified polyethylene, ethylene acrylic ester terpolymers and ethylene vinyl acetate terpolymers.

Those skilled in the art will be familiar with other adhesive lamination technology that would be suitable for adhering various types of plastics, including heat activated and UV activated systems. Exemplary adhesives may include, polyurethane, epoxy, nylon, acrylic and acrylate.

Polyurethane based adhesives may be particularly suitable for fixing the other layer to the layer comprising a starch composition. The polyurethane adhesive may be prepared in situ through reaction of one or more isocyanates with the starch layer. Through reaction of the surface hydroxyl functions of the starch with isocyanate, urethane functions are formed. Preferred isocyanates are diisocyanates. Those skilled in the art would be able to select suitable isocyanates from the wide range typically employed in the art of polyurethane synthesis.

Alternatively, the polyurethane adhesive may comprise one or more polyols. Such two component systems comprising diisocyanate and polyol are well known in the art.

The adhesives may or may not contain solvent. The solvent may be organic or water based.

Exemplary isocyanates include methylene diphenyl diisocyanate and toluene diisocyanate. Exemplary polyols include polyether polyols such as polyethylene glycol or polypropylene glycol and polyester polyols such as adipate based polyols.

Method of Preparation of the Multilayer Film

The multilayer film may be made by a variety of processes. The multilayer film may be made by co-extrusion, coating, extrusion coating, extrusion lamination and other laminating processes. The film may also be made by casting or blown film processes.

Coextrusion tends to use tie layers, and utilises modified other layers, such as modified (grafted) polyolefins. Coextrusion is generally able to achieve thinner overall gauges. Lamination is more suitable for thicker multilayer films utilising an adhesive. Extrusion coating may produce a coated product in an in-line process. Extrusion coating can apply much thinner polymer layers of polyolefin or polyester on to a substrate using a suitable adhesive resin.

In one embodiment a three layer film is provided comprising an inner layer comprising the starch composition and two outer polyolefin layers. In other embodiments adhesive layers may be employed between the layer comprising the starch composition and the polyolefin layers thus yielding a five layer film.

In another embodiment the starch layer may be extrusion coated onto a film substrate, for example a biaxially orientated polypropylene or paper substrate and then another layer, for example, a polyolefin or polyester layer, may be extrusion coated onto the starch layer.

Applications of Multilayer Film

It will be understood by those with skill in the art that a three or five layer film is only one of many possible embodiments that employs starch and other layers. The number of layers and their relative thicknesses may be adjusted depending on the function or end-use of the film.

Additionally, further film layers comprising other materials commonly utilised in barrier film applications may be envisaged. Exemplary further film layers include metallised films, non-polymer films and the like.

The multilayer film may have many applications including grocery bags, stretch-wraps, food packaging films, package containers, package lids where low water vapour and oxygen transmission rates are required.

EXAMPLES

Three, chemically modified, low amylose starches were obtained from Ingredion Incorporated as summarised in Table 1. The amylose content of each of the starches was below 40% by weight.

TABLE 1

Modified Low Amylose Starches

| Material | Source | Modification Agent | Modification level %[1] | DS[2] | Crosslinking | Crosslinking level %[3] |
|---|---|---|---|---|---|---|
| National 7 | Tapioca | Propylene Oxide | 3 | 0.086 | None | — |
| National Frigex ® | Tapioca | Propylene Oxide | 6 | 0.175 | POCl$_3$ | 0.012 |
| National 1658 | Corn | Propylene Oxide | 8 | 0.238 | POCl$_3$ | 0.008 |

[1]modification level %
[2]degree of substitution
[3]crosslinking level % is the % by weight of crosslinking agent relative to the weight of the dry starch These low amylose starches (second starches) replaced between 0 and 50% by weight of a non-crosslinked, hydroxypropyl modified high amylose starch (first starch) having an amylose content of about 70% by weight in a starch composition. Each of the starch compositions was thermally processed with polyvinylalcohol, stearic acid and Cloisite 20A, formed into sheets and then thermoformed into trays in a thermoforming machine at 120° C. The total amount of first and second starches in the compositions was about 90% by weight based on the total dry weight of the compositions. The amount of PVA, stearic acid and Cloisite 20A were approximately 10%, 0.5% and 2% respectively by weight.

Table 2 summarises the compositions prepared. Note that each of the compositions having 0% of second starch component are comparative compositions.

TABLE 2

Starch Compositions

| Composition # | Amount of second starch by weight % (based on the total dry weight of starch in the composition) |
|---|---|
| 1 | 0% |
| 2 | 5% National 7 |
| 3 | 10% National 7 |
| 4 | 20% National 7 |
| 5 | 30% National 7 |
| 6 | 40% National 7 |
| 7 | 50% National 7 |
| 8 | 0% |
| 9 | 10% National Frigex ® |
| 10 | 20% National Frigex ® |
| 11 | 30% National Frigex ® |
| 12 | 40% National Frigex ® |
| 13 | 0% |
| 14 | 10% National 1658 |
| 15 | 20% National 1658 |
| 16 | 30% National 1658 |
| 17 | 40% National 1658 |

Drop Test Procedure

The thermoformed trays produced from the sheet material were loaded with 125 g of weight, sealed in a cardboard box and conditioned at 23° C. and at 35% RH or 50% RH for 48 hours. The conditioned samples were then dropped from a height of 0.9 m (equivalent to 1.1 J impact energy) for the 35% humidity conditioned trays and at 1.5 m (equivalent to 1.8 J impact energy) for the 50% humidity conditioned trays. The results of the drop tests were assessed according to the following definitions and graded as set out in Table 3.

Crack: running from the edge or inside the tray.

Chip: a piece missing from the edge of the tray. The size is the maximum dimension of the missing portion, not including any associated crack Hole: occurs in the middle of a tray. The size is the maximum dimension of the missing portion, not including any associated crack.

Separated piece: a large piece that is 75% or more detached from the tray.

TABLE 3

Grading of drop test performance

| Category | Defects | | | Number |
| | Crack Size (mm) | Chip Size (mm) | Hole Size (mm) | Total allowable defects |
|---|---|---|---|---|
| 0 | 0 | 0 | 0 | 0 |
| 1 | ≤10 | ≤5 | 0 | ≤2 |
| 2 | ≤30 | ≤20 | ≤10 | ≤4 |
| 3 | ≤30 | ≤20 | ≤10 | ≤6 |
| 4 | >30 | >20 | >10 | ≤4 |
| 5 | >30 | >20 | >10 | >4, or ≥1 separated piece |

Due to the severe nature of the test, and critical defect points contained within the thermoformed tray, a drop test score of about 3 or less is considered acceptable. The test was developed to effectively grade the starch compositions, a less severe test being unable to distinguish any improvements in performance. Table 4 collects the results of drop tests on trays made from the various compositions. Prior to testing each of the compositions, a comparative composition containing only the high amylose starch was tested. These are designated as the 0% results in Table 4 (compositions 1, 8 and 13). Further, compositions containing National 7 (non-crosslinked starch) are also considered comparative.

TABLE 4

Results of Drop Tests

| Composition # | Designation | Amount of second starch | 50% RH drop | 35% RH drop |
|---|---|---|---|---|
| 1 | Comparative | 0% | 0.03 | 3.60 |
| 2 | Comparative | 5% National 7 | 0.53 | 3.40 |
| 3 | Comparative | 10% National 7 | 0.30 | 3.70 |
| 4 | Comparative | 20% National 7 | 0.23 | 3.80 |
| 5 | Comparative | 30% National 7 | 0.93 | 4.00 |
| 6 | Comparative | 40% National 7 | 0.92 | 4.30 |
| 7 | Comparative | 50% National 7 | 1.50 | 4.45 |
| 8 | Comparative | 0% | 0.02 | 1.30 |
| 9 | Inventive | 10% National Frigex ® | 0.03 | 2.45 |
| 10 | Inventive | 20% National Frigex ® | 0 | 2.35 |
| 11 | Inventive | 30% National Frigex ® | 0.28 | 2.65 |
| 12 | Inventive | 40% National Frigex ® | 1.23 | 3.65 |
| 13 | Comparative | 0% | 0.03 | 1.78 |
| 14 | Inventive | 10% National 1658 | 0.05 | 2.3 |
| 15 | Inventive | 20% National 1658 | 0.15 | 3.1 |
| 16 | Inventive | 30% National 1658 | 0.07 | 2.85 |
| 17 | Inventive | 40% National 1658 | 0.33 | 2.8 |

Comparing the results of compositions 1 to 7 it is noted that replacing the high amylose starch in composition 1 with a non-crosslinked low amylose starch (National 7) results in poorer drop test performance, particularly at higher replacement amounts.

In contrast, comparing the results of compositions 8 to 12, replacement of up to 30% and even up to 40% of the high amylose starch in composition 8 with a crosslinked low amylose starch (National Frigex) results in acceptable drop test performance.

Comparing the results of compositions 13 to 17, replacement of up to 40% of the high amylose starch in composition 3 with a crosslinked low amylose starch (National 1658) also results in acceptable drop test performance.

A further series of tests were performed using commercially available acetylated low amylose tapioca starches. Details of these starches are set out in Table 5.

TABLE 5

Acetylated Starches

| Material | Source | Modification | Modification level %[1] | DS[2] | Crosslinking | Crosslinking level %[3] |
|---|---|---|---|---|---|---|
| Elastitex 2 | Tapioca | Acetylated | 1.6-1.9 | 0.06-0.04 | None | — |
| Purity ® 69 | Tapioca | Acetylated | 1.2-1.9 | 0.045-0.07 | POCl$_3$ | 0.0135 |

[1]modification level %
[2]degree of substitution
[3]crosslinking level % is the % by weight of crosslinking agent relative to the weight of the dry starch These acetylated starches (second starches) replaced 20% or 40% by weight of a non-crosslinked, hydroxypropyl modified high amylose starch (first starch) having an amylose content of about 70% by weight in a starch composition. Each of the starch compositions was thermally processed with polyvinylalcohol, stearic acid and Cloisite 20A, formed into sheets and then thermoformed into trays in a thermoforming machine at 120° C. The total amount of first and second starches in the compositions was about 90% by weight based on the total dry weight of the compositions. The amount of PVA, stearic acid and Cloisite 20A were approximately 10%, 0.5% and 2% respectively by weight.

Sheet samples, approximately 250 µm thick were drawn down to approximately 60 µm thick in a thermoforming machine. The drawn samples were assessed for Impact Strength using a Spencer Tester (ASTM D3420).

The sheets and trays were tested for impact performance and the results are collected in Table 6. The 0 wt. % entries are comparative examples using a non-crosslinked, hydroxypropyl modified high amylose starch (first starch).

TABLE 6

Impact Performance

| Amount of high amylose starch replaced (wt. %) | Impact Force (mN/µm) | |
|---|---|---|
| | Sheet | Tray |
| 0 | 31.2 | 30.5 |
| 20 (Elastitex 2) | 23.2 | 22.5 |
| 40 (Elastitex 2) | 17.7 | 17.0 |
| 0 | 28.1 | 29.9 |
| 20 (Purity ® 69) | 23.5 | 22.8 |
| 40 (Purity ® 69) | 23.1 | 19.4 |

The results demonstrate that replacement of the high amylose starch with Elastitex 2, a non-crosslinked, low amylose, acetylated starch, results in a reduction in impact performance. Replacement of the high amylose starch with Purity® 69, a crosslinked, low amylose, acetylated starch results in less of a reduction of impact strength, particularly at the 40% replacement level. This is significant because acetylated low amylose tapioca starch is of much lower cost that hydroxypropylated high amylose corn starch.

Figure 1:
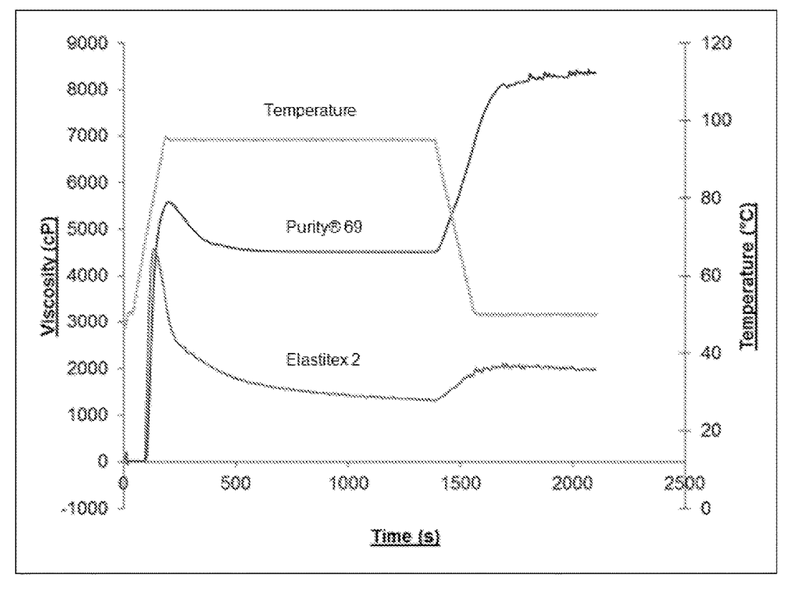
FIG. 1 illustrates viscosity data on a crosslinked and a non-crosslinked starch.

The Elastitex 2 and Purity® 69 starches were analysed using a Rapid Visco Analyser and the results are shown in FIG. 1. The analyses provide information on the swelling and gelatinisation behaviour of the starch. The crosslinked starch showed higher swelling before gelatinisation, less set back and higher final viscosity.

The starch compositions were also tested for barrier properties. Table 7 collects the results of oxygen transmission rate and water vapour transmission rate. OTR was measured using ASTM F 1927-98 and WVTR was measured using ASTM F 1249-01.

TABLE 7

Barrier Performance

| Amount of high amylose starch replaced (wt. %) | Oxygen Permeability Coefficient cm$^3$ · mm/m$^2$ · 24 h · atm at 23° C., 50-75 RH | Water Vapour Permeability Coefficient g · mm/m$^2$ · 24 hr · atm, at 38° C., 90% RH |
|---|---|---|
| 0 | 0.37 | 84.8 |
| 30% Purity 69 | 0.30 | — |
| 30% Elastitex 2 | — | 128.8 |

The barrier performance results indicate that replacement of 30% high amylose non-crosslinked starch with low amylose crosslinked starch decreases the rate of oxygen transmission. The results also indicate that replacing 30% high amylose non-crosslinked starch with low amylose non-crosslinked starch increases the rate of water vapour transmission.

Collectively the results demonstrate that significant proportions of expensive high amylose starch may be replaced by crosslinked low amylose starch and that thermoformed articles resulting therefrom have desirable physical properties, particularly impact performance and barrier performance.

The invention claimed is:

1. A starch composition comprising:
    a) at least one first starch having an amylose content greater than or equal to 50% by weight based on the dry weight of the first starch;
    b) at least one second starch having an amylose content less than or equal to 40% by weight based on the dry weight of the second starch; and
    c) polyvinyl alcohol;
   wherein both the at least one first starch and at least one second starch are chemically modified so as to replace hydroxyl functionality with functionality selected from ethers or esters and mixtures thereof;
   wherein the at least one first starch is a non-crosslinked starch and the at least one second starch is a crosslinked starch; and
   wherein the starch composition is free of plasticizers other than water.

2. The starch composition according to claim 1, wherein the at least one second starch is present in an amount of at least 5% by weight based on the total dry weight of starch in the composition.

3. The starch composition according to claim 1, wherein the at least one second starch is present in an amount from between 5% to 50% by weight, based on the total dry weight of starch in the composition.

4. The starch composition according to claim 1, wherein the at least one second starch is derived from a non-crosslinked starch treated with from 0.001 to 5% by weight of one or more crosslinking agents based on the dry weight of the non-crosslinked starch.

5. The starch composition according to claim 4, wherein the crosslinking agent is selected from phosphorus oxychloride, epichlorohydrin, hydrophobic cationic epoxides, sulphates, diacid anhydrides and phosphate derivatives prepared by reaction with sodium or potassium orthophosphate or tripolyphosphate and combinations thereof.

6. The starch composition according to claim 1, wherein the chemical modification independently comprises a hydroxyalkyl $C_{2-6}$ group or the product of reaction of starch with an anhydride of a carboxylic acid.

7. The starch composition according to claim 1, wherein the first and second starch are chemically modified so as to have a degree of substitution independently from 0.01 to 1.5.

8. The starch composition according to claim 1, wherein the first or second starch is independently selected from wheat starch, corn starch, tapioca starch, potato starch, cassava starch, pea starch, oat starch, arrowroot starch or rice starch or mixtures thereof.

9. The starch composition according to claim 1, wherein the first starch is a corn starch or a tapioca starch having an amylose content of greater than or equal to 50% by weight based on the dry weight of the first starch.

10. The starch composition according to claim 1, wherein the second starch is a corn starch or a tapioca starch having an amylose content of less than or equal to 40% by weight based on the total weight of the second starch.

11. The starch composition according to claim 1, wherein the first starch is a high amylose hydroxypropylated starch and the second starch is a low amylose hydroxypropylated starch.

12. The starch composition according to claim 1, wherein the first starch is a high amylose hydroxypropylated starch and the second starch is a low amylose acetylated starch.

13. The starch composition according to claim 1, further comprising one or more fillers or nanomaterials.

14. The starch composition according to claim 13 wherein the amount of filler is up to 20% by weight based on the total dry weight of the starch composition.

15. The starch composition according to claim 1, further comprising one or more fatty acids or salts thereof.

16. The starch composition according to claim 15, comprising between 0.1 to 5% by weight of a $C_{12-22}$ fatty acid and/or a $C_{12-22}$ fatty acid salt based on the total dry weight of the starch composition.

17. The starch composition according to claim 1 further comprising water.

18. The starch composition according to claim 1, wherein the oxygen permeability coefficient and/or the water vapour permeability coefficient of a film comprising said starch composition is/are decreased relative to a film comprising the at least one first starch and absent said second starch.

19. A thermoformed article comprising the starch composition according to claim 1.

20. A multilayer film comprising the starch composition according to claim 1.

21. The multilayer film according to claim 20 comprising:
(a) at least one layer comprising the starch composition; and
(b) at least one other layer;
wherein the at least one other layer has a water vapour permeability coefficient less than 1 g.mm/m$^2$.24 hr.atm measured at 38° C. and 90% relative humidity.

22. The multilayer film according to claim 20 wherein the other layer comprises a polyolefin, polyethylene terephthalate, nylon, polyvinylchloride, polyvinylidene dichloride, cellulose, a water resistant protein layer and mixtures thereof.

23. Packaging comprising the multilayer film according to claim 20.

24. A starch composition comprising:
a) at least one first starch having an amylose content greater than or equal to 50% by weight based on the dry weight of the first starch;
b) at least one second starch having an amylose content less than or equal to 40% by weight based on the dry weight of the second starch; and
c) polyvinyl alcohol;
wherein both the at least one first starch and at least one second starch are chemically modified so as to replace hydroxyl functionality with functionality selected from ethers or esters and mixtures thereof;
wherein the at least one first starch is a non-crosslinked starch and the at least one second starch is a crosslinked starch; and
wherein the starch composition is substantially free of plasticizers other than water.

25. A starch composition comprising:
a) at least one first starch having an amylose content greater than or equal to 50% by weight based on the dry weight of the first starch;
b) at least one second starch having an amylose content less than or equal to 40% by weight based on the dry weight of the second starch; and
c) polyvinyl alcohol;
wherein both the at least one first starch and at least one second starch are chemically modified so as to replace hydroxyl functionality with functionality selected from ethers or esters and mixtures thereof;
wherein the at least one first starch is a non-crosslinked starch and the at least one second starch is a crosslinked starch; and
wherein the starch composition further comprises a plasticizer consisting essentially of water.

* * * * *